United States Patent
Ali et al.

(10) Patent No.: US 7,063,382 B2
(45) Date of Patent: Jun. 20, 2006

(54) VEHICLE SEAT ASSEMBLY HAVING A VEHICLE OCCUPANT SENSING SYSTEM AND A SEAT CUSHION INSERT

(75) Inventors: Asad S. Ali, Troy, MI (US); Oliver J. Young, Grosse Pointe Farms, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/974,102

(22) Filed: Oct. 27, 2004

(65) Prior Publication Data

US 2005/0093350 A1   May 5, 2005

Related U.S. Application Data

(63) Continuation-in-part of application No. 10/884,838, filed on Jul. 2, 2004, which is a continuation-in-part of application No. 10/749,073, filed on Dec. 30, 2003, which is a continuation-in-part of application No. 10/606,649, filed on Jun. 26, 2003.

(51) Int. Cl.
*B69N 2/24* (2006.01)
(52) U.S. Cl. .................. 297/217.3; 297/216.1
(58) Field of Classification Search ............ 297/217.3, 297/216.1, 452.18, 463.1, 452.55, 452.26
See application file for complete search history.

(56) References Cited

U.S. PATENT DOCUMENTS

| | | | |
|---|---|---|---|
| 5,404,128 A | 4/1995 | Ogino et al. | 340/425.5 |
| 5,413,378 A | 5/1995 | Steffens, Jr. et al. | 280/735 |
| 5,474,327 A | 12/1995 | Schousek | 280/735 |
| 5,485,000 A | 1/1996 | Schneider | 235/494 |
| 5,570,903 A | 11/1996 | Meister et al. | 280/735 |
| 5,594,222 A | 1/1997 | Caldwell | 200/600 |
| 5,653,462 A | 8/1997 | Breed et al. | 280/735 |
| 5,694,320 A | 12/1997 | Breed | 364/424.055 |
| 5,731,781 A | 3/1998 | Reed | 342/135 |
| 5,739,757 A * | 4/1998 | Gioutsos | 340/667 |
| 5,748,473 A | 5/1998 | Breed et al. | 364/424.055 |
| 5,810,392 A | 9/1998 | Gagnon | 280/735 |
| 5,822,707 A | 10/1998 | Breed et al. | 701/49 |
| 5,829,782 A | 11/1998 | Breed et al. | 280/735 |
| 5,835,613 A | 11/1998 | Breed et al. | 382/100 |
| 5,848,802 A | 12/1998 | Breed et al. | 280/735 |
| 5,877,677 A | 3/1999 | Fleming et al. | 340/436 |
| 5,890,758 A | 4/1999 | Pone et al. | 297/15 |
| 5,901,978 A | 5/1999 | Breed et al. | 280/735 |
| 5,931,254 A | 8/1999 | Loraas et al. | 180/272 |
| 5,931,527 A | 8/1999 | D'Onofrie et al. | 297/146 |
| 5,943,295 A | 8/1999 | Varga et al. | 367/99 |

(Continued)

FOREIGN PATENT DOCUMENTS

EP   0 689 967 A1   3/1996

(Continued)

*Primary Examiner*—Milton Nelson, Jr.
(74) *Attorney, Agent, or Firm*—Bill Panagos

(57) ABSTRACT

A vehicle seat assembly for detecting a condition of the seat assembly. The vehicle seat assembly includes a seat cushion. The vehicle seat assembly also includes a vehicle occupant sensing system having a plurality of sensor assemblies. Each sensor assembly includes a base and an upper slide member. The upper slide member is supported for movement toward and away from the base in response to a condition of the seat cushion. Additionally, the vehicle seat assembly includes at least one seat cushion insert having a topside and an underside. The seat cushion insert is disposed between the seat cushion and the sensor assemblies, and the topside has at least one planar section.

6 Claims, 4 Drawing Sheets

U.S. PATENT DOCUMENTS

| | | | |
|---|---|---|---|
| 5,954,398 A | 9/1999 | Namba et al. | 297/257 |
| 5,971,432 A * | 10/1999 | Gagnon et al. | 280/735 |
| 5,975,612 A | 11/1999 | Macey et al. | 296/66 |
| 6,010,195 A * | 1/2000 | Masters et al. | 297/452.55 |
| 6,027,138 A | 2/2000 | Tanaka et al. | 280/735 |
| 6,039,139 A | 3/2000 | Breed et al. | 180/271 |
| 6,039,344 A * | 3/2000 | Mehney et al. | 280/735 |
| 6,043,743 A | 3/2000 | Saito et al. | 340/562 |
| 6,056,079 A | 5/2000 | Cech et al. | 180/273 |
| 6,078,854 A | 6/2000 | Breed et al. | 701/49 |
| 6,079,763 A | 6/2000 | Clemente | 296/65.05 |
| 6,081,757 A | 6/2000 | Breed et al. | 701/45 |
| 6,088,640 A | 7/2000 | Breed | 701/45 |
| 6,089,106 A * | 7/2000 | Patel et al. | 73/662.582 |
| 6,089,641 A | 7/2000 | Mattarella et al. | 296/64 |
| 6,092,838 A * | 7/2000 | Walker | 280/735 |
| 6,101,436 A | 8/2000 | Fortune et al. | 701/45 |
| 6,102,463 A | 8/2000 | Swanson et al. | 296/37.15 |
| 6,113,139 A * | 9/2000 | Heximer et al. | 280/735 |
| 6,116,639 A | 9/2000 | Breed et al. | 280/735 |
| 6,129,168 A | 10/2000 | Lotito et al. | 180/273 |
| 6,129,404 A | 10/2000 | Mattarella et al. | 296/65.09 |
| 6,134,492 A | 10/2000 | Breed et al. | 701/49 |
| 6,138,067 A | 10/2000 | Cobb et al. | 701/45 |
| 6,141,432 A | 10/2000 | Breed et al. | 382/100 |
| 6,168,198 B1 | 1/2001 | Breed et al. | 280/735 |
| 6,186,537 B1 | 2/2001 | Breed et al. | 280/735 |
| 6,220,627 B1 | 4/2001 | Stanley | 280/735 |
| 6,234,519 B1 | 5/2001 | Breed | 280/735 |
| 6,234,520 B1 | 5/2001 | Breed et al. | 280/735 |
| 6,242,701 B1 | 6/2001 | Breed et al. | 177/144 |
| 6,250,671 B1 | 6/2001 | Osmer et al. | 280/735 |
| 6,250,672 B1 | 6/2001 | Ryan et al. | 280/735 |
| 6,253,134 B1 | 6/2001 | Breed et al. | 701/49 |
| RE37,260 E | 7/2001 | Varga et al. | 367/99 |
| 6,254,127 B1 | 7/2001 | Breed et al. | 280/735 |
| 6,270,116 B1 | 8/2001 | Breed et al. | 280/735 |
| 6,279,946 B1 | 8/2001 | Johnson et al. | 280/734 |
| 6,283,503 B1 | 9/2001 | Breed et al. | 280/735 |
| 6,323,444 B1 | 11/2001 | Aoki | 177/144 |
| 6,324,453 B1 | 11/2001 | Breed et al. | 701/45 |
| 6,325,414 B1 | 12/2001 | Breed et al. | 280/735 |
| 6,330,501 B1 | 12/2001 | Breed et al. | 701/49 |
| 6,342,683 B1 | 1/2002 | Aoki et al. | 177/144 |
| 6,353,394 B1 | 3/2002 | Maeda et al. | 340/667 |
| 6,393,133 B1 | 5/2002 | Breed et al. | 382/100 |
| 6,394,490 B1 | 5/2002 | Osmer et al. | 280/735 |
| 6,397,136 B1 | 5/2002 | Breed et al. | 701/45 |
| 6,407,347 B1 | 6/2002 | Blakesley | 177/144 |
| 6,412,813 B1 | 7/2002 | Breed et al. | 280/735 |
| 6,416,080 B1 | 7/2002 | Gillis et al. | 280/735 |
| 6,422,595 B1 | 7/2002 | Breed et al. | 280/735 |
| 6,431,591 B1 | 8/2002 | Ray et al. | 280/735 |
| 6,442,465 B1 | 8/2002 | Breed et al. | 701/45 |
| 6,442,504 B1 | 8/2002 | Breed et al. | 702/173 |
| 6,445,988 B1 | 9/2002 | Breed et al. | 701/45 |
| 6,452,870 B1 | 9/2002 | Breed et al. | 367/99 |
| 6,457,545 B1 * | 10/2002 | Michaud et al. | 180/272 |
| 6,474,739 B1 | 11/2002 | Lagerweij | 297/341 |
| 6,476,514 B1 | 11/2002 | Schondorf | 307/10.1 |
| 6,506,069 B1 | 1/2003 | Babala et al. | 439/248 |
| 6,520,353 B1 | 2/2003 | Fulbright | 211/153 |
| 6,605,877 B1 | 8/2003 | Patterson et al. | 307/10.1 |
| 6,609,054 B1 | 8/2003 | Wallace | 701/45 |
| 6,609,752 B1 * | 8/2003 | Inoue | 297/217.3 |
| 6,661,341 B1 * | 12/2003 | Masuda et al. | 340/562 |
| 2002/0000742 A1 * | 1/2002 | Wato et al. | 297/216.1 |
| 2002/0003345 A1 | 1/2002 | Stanley et al. | 280/735 |
| 2002/0056975 A1 | 5/2002 | Yoon et al. | 280/735 |
| 2002/0079728 A1 | 6/2002 | Tame | 297/344.1 |
| 2002/0098730 A1 | 7/2002 | Babala et al. | 439/248 |
| 2002/0195807 A1 | 12/2002 | Ishida | 280/735 |
| 2003/0040858 A1 | 2/2003 | Wallace | 701/144 |
| 2003/0067149 A1 | 4/2003 | Gray et al. | 280/735 |
| 2003/0071479 A1 | 4/2003 | Schaller et al. | 296/144 |
| 2003/0090133 A1 | 5/2003 | Nathan et al. | 297/144 |
| 2003/0106723 A1 | 6/2003 | Thakur et al. | 177/144 |
| 2003/0111276 A1 | 6/2003 | Kajiyama | 177/144 |
| 2003/0158643 A1 | 8/2003 | Murphy et al. | 701/45 |
| 2003/0164715 A1 | 9/2003 | Lester | 324/661 |
| 2003/0171036 A1 | 9/2003 | Aujla et al. | 439/660 |
| 2003/0189362 A1 | 10/2003 | Lichtinger et al. | 297/217.3 |
| 2003/0196495 A1 | 10/2003 | Saunders et al. | 73/862.041 |
| 2003/0220766 A1 | 11/2003 | Saunders et al. | 702/173 |
| 2004/0040390 A1 | 3/2004 | Kojima et al. | 73/862.52 |

FOREIGN PATENT DOCUMENTS

| | | |
|---|---|---|
| WO | WO 98/41424 | 3/1997 |

\* cited by examiner

VEHICLE SEAT ASSEMBLY HAVING A VEHICLE OCCUPANT SENSING SYSTEM AND A SEAT CUSHION INSERT

CROSS-REFERENCE TO RELATED APPLICATIONS

This application is a continuation-in-part of U.S. Ser. No. 10/884,838, entitled "Vehicle Seat Assembly Having a Vehicle Occupant Sensing System and a Seat Cushion Insert Positioned Therein," and filed Jul. 2, 2004, which is a continuation-in-part of U.S. Ser. No. 10/749,073, entitled "Vehicle Seat Assembly Having a Vehicle Occupant Sensing System and Reinforcing Inserts Positioned Therein," and filed Dec. 30, 2003, which is a continuation-in-part of U.S. Ser. No. 10/606,649, entitled "Encapsulated Spring Sensor Assembly," and filed Jun. 26, 2003.

BACKGROUND OF THE INVENTION

1. Field of the Invention

The present invention relates, generally, to a vehicle seat assembly, and more particularly to a vehicle seat assembly having a vehicle occupant sensing system and a seat cushion insert.

2. Description of the Related Art

Automotive vehicles employ seating systems that accommodate the passengers of the vehicle. The seating systems include restraint systems that are calculated to restrain and protect the occupants in the event of a collision. The primary restraint system commonly employed in most vehicles today is the seatbelt. Seatbelts usually include a lap belt and a shoulder belt extending diagonally across the occupant's torso from one end of the lap belt to a mounting structure located proximate to the occupant's opposite shoulder.

In addition, automotive vehicles may include supplemental restraint systems. The most common supplemental restraint system employed in automotive vehicles today is the inflatable airbag. In the event of a collision, the airbags are deployed as an additional means of restraining and protecting the occupants of the vehicle. Originally, the supplemental inflatable restraints (airbags) were deployed in the event of a collision, whether or not any given seat was occupied. These supplemental inflatable restraints and their associated deployment systems are expensive and over time this deployment strategy was deemed not to be cost effective. Thus, there became a recognized need in the art for a means to selectively control the deployment of the airbags such that deployment occurs only when the seat is occupied.

Partially in response to this need, vehicle safety systems have been proposed that are capable of detecting whether or not a given seat is occupied. The systems act as a switch in controlling the deployment of a corresponding air bag. If the occupant sensing device detects that a seat is unoccupied during a collision, it can prevent the corresponding air bag from deploying, thereby saving the vehicle owner the unnecessary cost of replacing the expended air bag.

Furthermore, many airbag deployment forces and speeds have generally been optimized to restrain one hundred eighty pound males because the one hundred eighty pound male represents the mean average for all types of vehicle occupants. However, the airbag deployment force and speed required to restrain a one hundred eighty pound male exceeds that which are required to restrain smaller occupants, such as some females and small children. Thus, there became a recognized need in the art for occupant sensing systems that could be used to selectively control the deployment of the airbags when a person below a predetermined weight occupies the seat.

Accordingly, other vehicle safety systems have been proposed that are capable of detecting the weight of an occupant. In one such air bag system, if the occupant's weight falls below a predetermined level, then the system can suppress the inflation of the air bag or will prevent the air bag from deploying at all. This reduces the risk of injury that the inflating air bag could otherwise cause to the smaller-sized occupant.

Also, many airbag deployment forces and speeds have generally been optimized to restrain a person sitting generally upright toward the back of the seat. However, the airbag deployment force and speed may inappropriately restrain a person sitting otherwise. Thus, there became a recognized need in the art for a way to selectively control the deployment of an airbag depending on the occupant's sitting position.

Partially in response to this need, other vehicle safety systems have been proposed that are capable of detecting the position of an occupant within a seat. For example, if the system detects that the occupant is positioned toward the front of the seat, the system will suppress the inflation of the air bag or will prevent the air bag from deploying at all. This reduces the risk of injury that the inflating air bag could otherwise cause to the occupant. It will be appreciated that these occupant sensing systems provide valuable data, allowing the vehicle safety systems to function more effectively to reduce injuries to vehicle occupants.

One necessary component common to the occupant sensing systems discussed above is a means for sensing a condition of the vehicle seat, such as whether or not the seat is occupied or whether the occupant is seated in a certain position. The sensing means is often positioned under or within the lower seat cushion, and the sensing means can include components made from a hard material. In contrast, the vehicle seat is usually filled with a soft, pliable foam cushion, and the vehicle seat is typically covered with a fabric or leather trim. Weight loading from the occupant presses the soft cushion into the hard sensing means. Over time, the cushion and possibly the trim of the vehicle seat can prematurely wear due to repeated loading from the harder material of the sensing means. This is especially true of the inboard and outboard sides of the vehicle seat because there is less foam thickness in those areas and because they bear most of the load when the occupant gets in and out of the vehicle. Once the foam of the seat cushion begins to wear, the occupant is more likely to feel the sensing means through the cushion, and this can make sitting on the vehicle seat uncomfortable. Accordingly, there is an ongoing need in the art for a vehicle seat assembly that is reinforced to inhibit premature wear and discomfort caused by the sensing means positioned within the seat assembly.

Moreover, the lower seat cushion is typically a uniform foam piece. Weight from the occupant of the seat cushion deflects the uniform foam piece into the sensing means in some occupant sensing systems, thereby causing a response from the sensing means indicative of the presence of the occupant. An example of such a system can be found in the published patent application having U.S. Ser. No. 10/249,527 and Publication No. US2003/0196495 A1 filed in the name of Saunders et al. In these systems the seat cushion foam exhibits certain material characteristics, such as density, indentation load deflection (ILD), and the like, that affect the response of the sensing means. For instance, a seat cushion with denser foam may deflect less and transfer less load from the occupant to the sensing means in comparison to a seat cushion with less dense foam. In that example, the sensing means associated with the denser foam might detect less load from the occupant as compared with the sensing means associated with the less dense foam. Thus, the response of the sensing means can be related to the material characteristics of the foam in the seat cushion.

Although vehicle seat assemblies with uniform lower seat cushions have generally worked for their intended purposes, problems still remain. For instance, the load bearing characteristics of the seat cushion may need to be changed, for instance, to meet changes in cushion requirements or to vary the response of the sensing means. The entire uniform seat cushion can be replaced, but this adds unnecessary cost and time to the assembly of the vehicle seat assembly. Accordingly, there is an ongoing need in the art for a vehicle seat assembly in which the load bearing characteristics of the seat cushion that can be changed more easily and at lower cost.

Furthermore, voids can develop in the seat foam during its manufacture. Gas bubbles move through the mold used to create the seat cushion. As the foam material cures, the bubbles settle—usually at the outer surfaces—and create voids. The voids can detrimentally affect the response of the sensing means. If the outer surfaces of the seat foam are curved, the bubbles typically congregate near those surfaces. The resultant voids exacerbate the detrimental effect on the response of the sensing means. Accordingly, there is also an ongoing need in the art for a vehicle seat assembly with a seat cushion design less likely to develop a congregation of voids during manufacture such that the associated sensing means can respond more accurately in detecting the presence of an occupant.

SUMMARY OF THE INVENTION

The present invention overcomes the disadvantages of the prior art in a vehicle seat assembly that includes a seat cushion. The vehicle seat assembly also includes a vehicle occupant sensing system having a plurality of sensor assemblies. Each sensor assembly includes a base and an upper slide member. The upper slide member is supported for movement toward and away from the base in response to a condition of the seat cushion. Additionally, the vehicle seat assembly includes at least one seat cushion insert having a topside and an underside. The seat cushion insert is disposed between the seat cushion and the sensor assemblies, and the topside has at least one planar section.

One advantage of the present invention is that a vehicle seat assembly is provided with a seat cushion insert. The shape of the seat cushion insert of the present invention is less likely to have voids concentrated thereon, thereby improving the response of the vehicle occupant sensing system.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
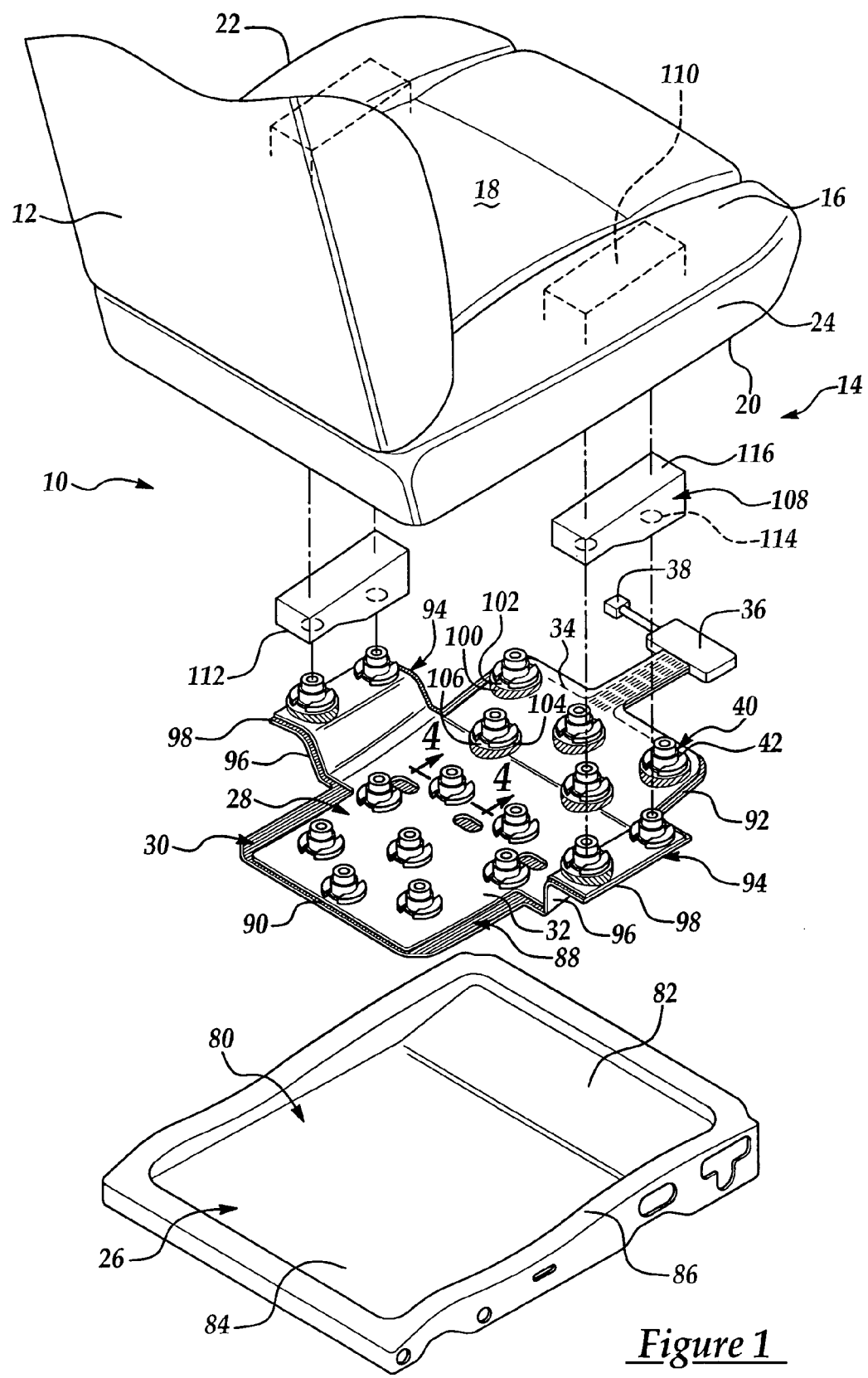
FIG. 1 is an exploded perspective view of a vehicle seat assembly having reinforcement inserts.

Referring now to the drawings, where like numerals are used to designate like structure throughout the figures, an exploded view of one embodiment of the vehicle seat assembly of the present invention is generally indicated at 10 in FIG. 1. The vehicle seat assembly 10 includes a seat back, generally indicated at 12, and a lower seat assembly, generally indicated at 14. The lower seat assembly 14 has a seat cushion 16 that defines an upper surface 18, and a lower surface 20 that is spaced from the upper surface 18. The upper surface 18 of the seat cushion 16 may be referred to as the "A-surface" and the lower surface 20 may be referred to as the "B-surface." The seat cushion 16 also defines an inboard side 22 and an outboard side 24. When an occupant (not shown) is supported on the lower seat assembly 14, the weight of the occupant will apply an axial load directed generally through the upper surface 18 of the seat cushion 16 toward the lower surface 20. Although the weight of the occupant will induce an axial as well as shear forces in the seat cushion 16, those having ordinary skill in the art will recognize that the primary load path of the occupant's weight will be substantially vertical from the upper surface 18 toward the lower surface 20, through the seat cushion 16.

The lower seat assembly 14 also includes a seat pan, generally indicated at 26. The seat pan 26 is generally disposed beneath the lower surface 18 so as to support the seat cushion 16. In turn, the seat pan 26 is operatively supported relative to the floor of the vehicle using any suitable structure of the type commonly known in the art, such as a seat track (not shown). In addition, the vehicle seat assembly 10 includes a vehicle occupant sensing system, generally indicated at 28. The vehicle occupant sensing system 28 is used for detecting a condition of the vehicle seat assembly 10, such as whether or not the vehicle seat assembly 10 is occupied, whether the occupant is above or below a certain weight requirement or whether the occupant is sitting in a certain position.

The sensing system 28 includes a circuit carrier tray, generally indicated at 30, that is supported by the seat pan 26. The tray 30 supports components of the vehicle occupant sensing system 28 as will be described in greater detail below. The vehicle occupant sensing system 28 also includes a circuit carrier 32, which is disposed adjacent the lower surface 20 of the seat cushion 16. The tray 30 supports the circuit carrier 32. In addition, the vehicle occupant sensing system 28 includes an electric circuit 34, which in turn, is supported by the circuit carrier 32. The circuit carrier 32 is made of a thin nonconductive and corrosion-resistant material, and it encapsulates known electrical components that form the electric circuit 34. For instance, in one embodiment, a flexible printed circuit forms the circuit carrier 32 and electric circuit 34.

The electric circuit 34 is electrically connected to a controller schematically illustrated at 36. As described in greater detail below, the electric circuit 34 carries electric signals generated by the vehicle occupant sensing system 28 to the controller 36. The controller 36 is electrically attached to a restraint system, schematically illustrated at 38. The restraint system 38 can be of many types, such as an inflatable air bag system, and the controller 36 sends output to the restraint system 38 based on the signals delivered by the electric circuit 34. Although an inflatable airbag restraint system is discussed here, those having ordinary skill in the art will recognize that the type of restraint system 38 connected to the controller 36 does not limit the scope of the present invention.

As shown, the system 28 also includes a plurality of low profile sensor assemblies 40 that are supported by the tray 30, below the lower surface 20 of the seat cushion 16. In one embodiment not shown, the lower surface 20 includes a plurality of depressions, and each of the low profile sensor assemblies 40 are spaced according to a corresponding depression formed in the lower surface 20 of the seat cushion 16.

A sensor, generally indicated at 42, is operatively fixed relative to each of the low profile sensor assemblies 40. The sensor is in electrical communication with the electric circuit 34. The low profile sensor assemblies 40 each cooperatively operate with the associated sensors 42 to detect a condition of the vehicle seat 10 as will be described in greater detail below. For example, the low profile sensor assemblies 40 and sensors 42 can operate to detect that the vehicle seat 10 is unoccupied, is occupied by a person of a particular weight, or is occupied by a person sitting in a particular position. As will be discussed in greater detail below, the sensor assemblies 40 can collapse in a more compact manner than similar sensor assemblies of the prior art. Advantageously, these low profile sensor assemblies 40 allow an occupant to sit more comfortably upon the vehicle seat 10.

Figure 4:
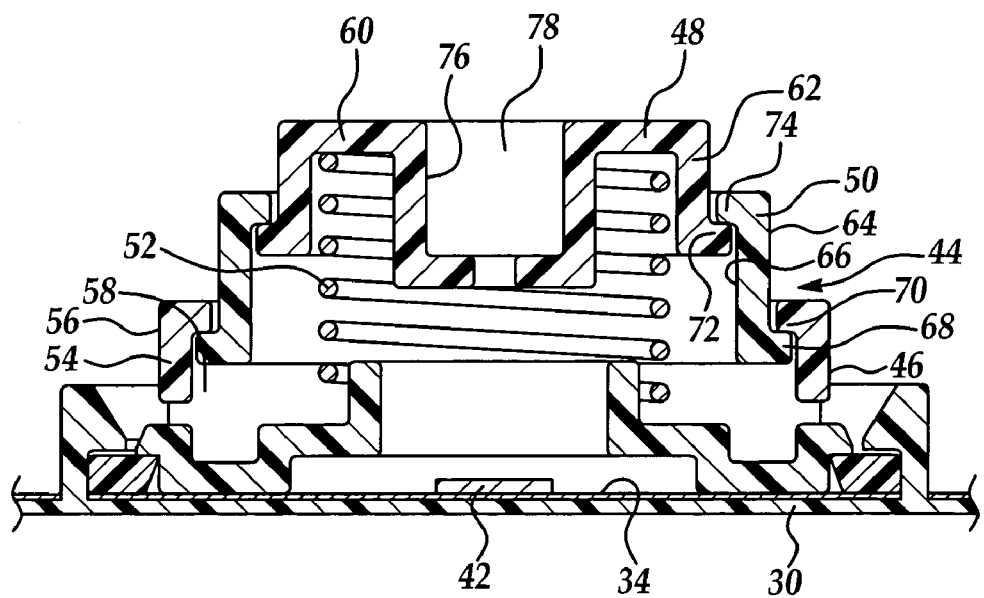
FIG. 4 is a cross-sectional side view of the sensor assembly employed in the vehicle occupant sensing system of the present invention.

One embodiment of the low profile sensor assembly 40 is shown in FIG. 4. The low profile sensor assembly 40 generally includes a housing 44, having a base 46, an upper slide member 48, and an intermediate guide member 50 disposed between the upper slide member 48 and the base 46. The upper slide member 48 and the intermediate guide member 50 are both supported for movement toward and away from the base 46. A biasing member 52 acts to bias the upper slide member 48 and intermediate guide member 50 away from the base 46 as will be described in greater detail below.

In the preferred embodiment illustrated in these figures, the base 46 includes a base guide 54, which is shaped like a hollow tube so as to define a wall 56 with a bore 58 extending axially therethrough. The upper slide member 48 includes an upper disc portion 60 and a support wall 62 extending axially downward from the outer circumference of the upper disc portion 60. The support wall 62 has a smaller diameter than the diameter of the intermediate guide member 50 such that the upper slide member 48 can move axially through the intermediate guide member 50. The biasing member 52 is disposed between the base 46 and the upper disc portion 60 of the upper slide member 48.

The intermediate guide member 50 is operatively supported for axial movement between the base 46 and the upper slide member 48. To this end, the intermediate guide member 50 is substantially tubular so as to define an outer surface 64 and an inner surface 66. The diameter of the intermediate guide member 50 is smaller than the diameter of the bore 58 of the base guide 54 such that the intermediate guide member 50 can move axially through the bore 58.

The intermediate guide member 50 includes a lower flange 68 formed on its lower end, and the base 46 includes an upper flange 70 formed on the upper end of the base guide 54. In the embodiment shown, the lower flange 68 of the intermediate guide member 50 extends radially outward, and the upper flange 70 of the base 46 extends radially inward. The diameter of the lower flange 68 is larger than the diameter of the upper flange 70. As such, the intermediate guide member 50 can be positioned within the bore 58 of the base guide 54. As the lower flange 68 of the intermediate guide member 50 slides toward the upper flange 70, the upper flange 70 interferes with the lower flange 68, thereby inhibiting further upward movement of the intermediate guide member 50. Thus, the upper flange 70 on the base 46 and the lower flange 68 on the intermediate guide member 50 cooperate to define the limit of sliding movement of the intermediate guide member 50 away from the base 35.

The upper slide member 48 includes a lower flange 72 formed on its lower end. On the other hand, the intermediate guide member 50 includes an upper flange 74 formed on its upper end. In the embodiment shown, the lower flange 72 of the upper slide member 48 extends radially outward, and the upper flange 74 of the intermediate guide member 50 extends radially inward. The diameter of the lower flange 72 is larger than the diameter of the upper flange 74. As such, the upper slide member 48 can be positioned within the intermediate guide member 50. As the lower flange 72 of the upper slide member 48 slides toward the upper flange 74 under the influence of the biasing force generated by the biasing member 52, the upper flange 74 interferes with the lower flange 72, thereby inhibiting further upward movement of the upper slide member 48. Thus, the upper flange 74 on the intermediate guide member 50 and the lower flange 72 on the upper slide member 48 cooperate to define the limit of sliding movement of the upper slide member 48 away from the base 46.

Furthermore, the upper slide member 48 includes a retainer 76 extending in the general direction of the base 46. In the embodiment shown, the retainer 76 is cup-shaped and extends from the center of the upper disc portion 60 of the upper slide member 48 in the direction of the base 46. In the embodiment shown in FIGS. 3 and 4, the sensor assemblies 40 include an emitter 78, such as a magnet, which is operatively contained in and supported by the retainer 76.

As noted above, the vehicle occupant sensing system 28 further includes at least one sensor 42. The sensor 42 is operatively supported by the circuit carrier 32 adjacent the sensor assembly 40. In the embodiment shown here, the sensor 42 is positioned below the base 46 of the sensor assembly 40. The sensor 42 can be one of many types, including but not limited to a Hall effect sensor. If the sensor 42 is a Hall effect sensor, it detects the change in magnetic flux caused by the movement of the emitter 78 within the upper slide member 48 of the sensor assembly 40, and the sensor 42 generates a signal correlative of this change in magnetic flux. In this way, the sensor 42 is adapted to detect a condition of the vehicle seat assembly 10, such as whether or not it is occupied or whether the occupant is sitting in a certain position, based on the response of the sensor assembly 40. The signals generated by the sensor 42 are carried through the electric circuit 34 to the controller 36, which sends output to the restraint system 38 based on the signals generated by the sensor 42.

The weight of an occupant will deform the seat cushion 16 such that the lower surface 20 of the seat cushion 16 pushes the upper slide member 48 toward the base 46. As the upper slide member 48 moves, the sensor 42 detects an increase in magnetic flux density generated by the approaching emitter 78. In this way, the sensor 42 is operable to detect movement of the upper slide member 48 toward and away from the base 46. In turn, the sensor 42 generates a responsive signal indicative of the increase in flux density, and the controller 36 sends output to the restraint system 38 based on these signals. The sensor assemblies 40 may be of the type described in detail in applicant's co-pending patent application Ser. No. 10/748,536, entitled "Vehicle Occupant Sensing System Having a Low Profile Sensor Assembly," which is incorporated herein in its entirety by reference. Also, the sensors 42 and their method of attachment may be of a type described in detail in applicant's co-pending patent application Ser. No. 10/748,514, entitled "Vehicle Occupant Sensing System and Method of Electrically Attaching a Sensor to an Electrical Circuit," which is incorporated herein in its entirety by reference.

As described above, the assembly 14 has a seat pan 26 which includes a substantially flat main body 80 that defines a forward portion 82 and a rear portion 84. The seat pan 26 is positioned such that the rear portion 84 is disposed closer to the seat back 12 than the forward portion 82. The rear portion 84 of the seat pan 26 is substantially horizontal and parallel to the upper surface 18 of the seat cushion 16. Also, the forward portion 82 of the seat pan 26 is disposed at a positive angle relative to the horizontal plane of the rear portion 84 of the seat pan 26. Angling the forward portion 82 allows the seat pan 26 to more effectively bear forward inertial loads of the occupant during a sudden deceleration, such as those experienced in a frontal collision. This reduces the risk of injury otherwise caused when the forward inertial loads force the occupant off of the front of the seat cushion 16 and is one example of a design component calculated for compliance with governmental motor vehicle safety standards, such as 49 C.F.R. §§ 571.207-208 (2003).

The seat pan 26 also includes at least one bolster 86. In the embodiment shown, there are two bolsters 86 which each extend upward toward the lower surface 20 of the seat cushion 16, and each are formed spaced from the main body 80 of the seat pan 26. Specifically, each bolster 86 is attached to opposite sides of the main body 80 so as to be disposed under the inboard side 22 and outboard side 24 of the seat cushion 16, respectively.

As noted above, the vehicle seat assembly 10 includes a circuit carrier tray 30. The tray 30 is adapted to be disposed between the seat pan 26 and the seat cushion 16. In one embodiment, the tray 30 is made out of a rigid plastic material. The tray 30 has a main body portion 88 that is substantially flat and shaped so as to correspond with the main body 80 of the seat pan 26. Specifically, the main body portion 88 of the tray 30 includes a rear portion 90 that is substantially horizontal and parallel to the upper surface 18 of the seat cushion 20 so as to correspond to the rear portion 84 of the seat pan 26. The main body portion 88 of the tray 30 also includes a forward portion 92 that is disposed at a positive angle relative to a horizontal plane of the rear portion 90 of the tray 30 so as to correspond to the forward portion 82 of the seat pan 26.

The tray 30 also includes at least one bolster 94. In the embodiment shown, there are two bolsters 94, each L-shaped so as to define a vertical portion 96 and a horizontal portion 98. The vertical portion 96 of each bolster 94 is attached at opposite sides of the main body portion 88 such that the horizontal portion 98 of each bolster 94 is spaced vertically from the main body portion 88 of the tray 30. The tray 30 is positioned such that each bolster 94 corresponds with at least one bolster 86 of the seat pan 26. More specifically, the tray 30 is positioned on the seat pan 26 such that the main body portion 88 of the tray 30 lays flat on the main body 80 of the seat pan 26 and the horizontal portion 98 of each bolster 94 of the tray 30 extends upward to lay flat on the corresponding bolster 86 of the seat pan 26.

Moreover, the tray 30 includes a plurality of pedestals 100 formed thereon. At least some of the pedestals 100 are formed on the forward portion 92 of the tray 30. In the preferred embodiment shown here, the pedestals 100 are tubular-shaped and each pedestal 100 extends vertically from the forward portion 92 of the tray 30. The pedestals 100 each define a substantially flat top surface 102 spaced away from the main body portion 88 of the tray 30. In the embodiment shown, each pedestal 100 extends at a positive angle relative to the plane of the forward portion 92 such that the plane of each top surface 102 is substantially parallel with the rear portion 90 of the tray 30. Although the pedestals 100 are shown integrally attached to the tray 30, those having ordinary skill in the art will recognize that the pedestals 100 could be separate from the rest of the tray 30 without departing from the scope of the invention.

In the preferred embodiment, a pedestal 100 is also formed on each bolster 94. Specifically, this pedestal 100 is defined near the rear of the horizontal portion 98 of each bolster 94. The pedestals 100 on the bolsters 94 extend at a positive angle relative to the plane of the rear of the horizontal portion 98 of the respective bolster 94 such that the top surface 102 of these pedestals 100 are substantially parallel with the rear portion 90 of the tray 30.

As shown in FIG. 1, the circuit carrier 32 also includes a plurality of slits 104 extending through the circuit carrier 32 such that each slit 104 defines a flap 106 of the circuit carrier 32. Each of the slits 104 is cut in the form of a partial ellipse and is spaced according to the spacing of the pedestals 100. As such, when the circuit carrier 32 is positioned on the tray 30, the flaps 106 of the circuit carrier 32 lay directly on the top surface 102 of each pedestal 100 while the remaining portions of the circuit carrier 32 lies flat on the remaining portions of the tray 30.

In the embodiment shown, the sensor assemblies 40 are positioned on the rear portion 90, the forward portion 92, and on the bolsters 94 of the tray 30. At least some of the sensor assemblies 40 positioned on the forward portion 92 of the tray 30 are positioned on the top surface 102 of the pedestals 100. The sensor assemblies 40 positioned on the rear of the bolsters 94 are also positioned on the top surface 102 of the respective pedestals 100. Specifically, in the embodiment shown, each of the pedestals 100 supports one sensor assembly 40.

The tray 30 supports each sensor assembly 40, with the upper slide member 48 in close proximity to the lower surface 20 of the seat cushion 16. As noted above, when an occupant sits on the upper surface 18 of the seat cushion 16, the occupant's weight transfers through the seat cushion 16, causing the lower surface 20 to move toward the upper slide members 48 and depress them into the respective base 46. Movement of the upper slide members 48 causes the respective sensors 42 to generate the correlating signals, which are sent through the electric circuit 34 to the controller 36. The controller 36 sends output to the restraint system 38 based on these signals.

Thus, the vehicle occupant sensing system 28 responds when an occupant is present in the vehicle seat assembly 10 because some or all of the upper slide members 48 are depressed, and a person of a certain weight will depress the upper slide members 48 a predetermined amount, causing a predetermined signal response from the sensors 42. Similarly, when the vehicle seat assembly 10 is vacant, all of the sensor assemblies 40 are at a free height, causing another predetermined signal response from the sensors 42. Also, when the occupant is seated in a certain way, a number of upper slide members 48 are depressed in a certain pattern, causing a predetermined signal response from the sensors 42. In this way, the sensor assemblies 40 are responsive to the condition of the vehicle seat assembly 10, and the controller 36 can send output to the restraint system 38 based on these predetermined signal responses. However, those having ordinary skill in the art will recognize that the vehicle occupant sensing system 28 could be responsive to any one of a plurality of vehicle seat conditions without limiting the present invention.

Figure 2:
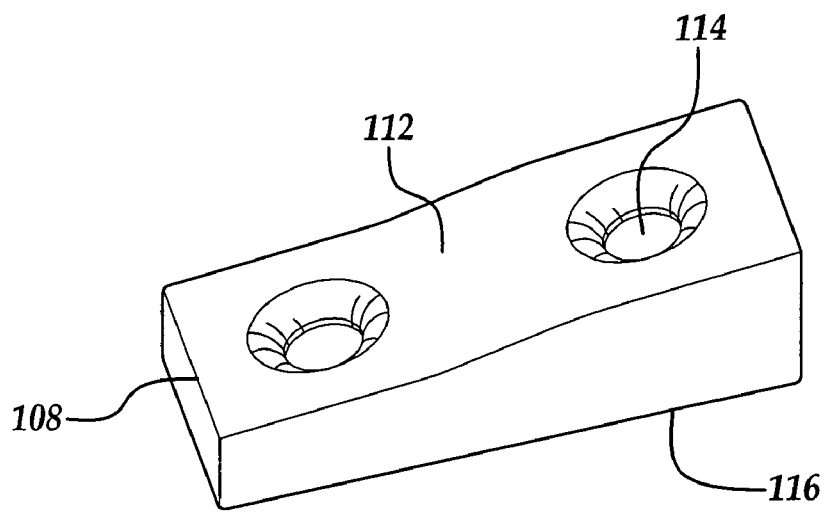
FIG. 2 is a bottom perspective view of the reinforcement inserts of the present invention.

As shown in FIGS. 1 and 2, the vehicle seat assembly 10 includes at least one reinforcing insert 108. In the embodiment shown, there are two reinforcing inserts 108, each having a block-type shape. In one embodiment, the reinforcing inserts 108 are made out of a material having a higher density than that of the seat cushion 16. For example, the reinforcing inserts 108 can be made out of plastic, non-woven fabric, expanded bead foam, or urethane foam. However, the reinforcing inserts 108 can be made out of any other reinforcing material without departing from the scope of the invention.

The reinforcing inserts 108 are disposed between at least one of the sensor assemblies 40 and the lower surface 20 of the seat cushion 16. The reinforcing inserts 108 correspond with the bolster 86 of the seat pan 26, positioned adjacent at least one of the inboard side 22 and the outboard side 24 of the seat cushion 16.

The seat cushion 16 includes at least one recess shown in phantom in FIG. 1 and indicated at 110. In one preferred embodiment illustrated here, there are two recesses 110, each formed on the lower surface 20 of the seat cushion 16. Each recess 110 is generally rectangular and extends upward toward the upper surface 18 of the seat cushion 16. One recess 110 is positioned adjacent the inboard side 22 of the seat cushion 16, and the other recess 110 is positioned adjacent the outboard 24 side. As such, the recesses 110 in the seat cushion 16 are adapted to receive the reinforcing inserts 108 such that the reinforcing inserts 110 fit snugly therein.

Moreover, at least one of the upper slide members 48 of the sensor assemblies 40 engages with the respective reinforcing inserts 108. Specifically, the two upper slide members 48 of the sensor assemblies 40 positioned adjacent the inboard side 22 of the seat cushion 16 engage with the reinforcing insert 108 positioned on the inboard side 22. Similarly, the two upper slide members 48 of the sensor assemblies 40 positioned adjacent the outboard side 24 of the seat cushion 16 engage with the reinforcing insert 108 positioned on the outboard side 24.

In the embodiment shown FIG. 2, an underside 112 of the reinforcing insert 108 is stepped. As such, the underside 112 of the reinforcing insert 108 can sit level on both engaging sensor assemblies 40. Specifically, the sensor assembly 40 attached further to the back of the tray 30 sits slightly higher than the other sensor assembly 40, and the stepped underside 112 of the reinforcing insert 108 accommodates for the unequal heights of the upper slide members 48 of the respective sensor assemblies 40 that engage with the reinforcing insert 108.

Furthermore, as shown in FIG. 2, the reinforcing insert 108 includes at least one indent 114 adapted to receive at least one of the sensor assemblies 40. In the embodiment shown, the reinforcing insert 108 includes two indents 114, each circular in shape and extending upward from the underside 112 in a direction normal to a topside 116 of the reinforcing insert 108. The reinforcing insert 108 is positioned such that the two upper slide members 48 are both received by the indents 114 on the respective reinforcing insert 108. Preferably, the shape and positioning of the reinforcing insert 108 is such that when the vehicle seat assembly 10 is vacant, the reinforcing inserts 108 do not depress the upper slide members 48 into the corresponding bases 46.

Figure 3:
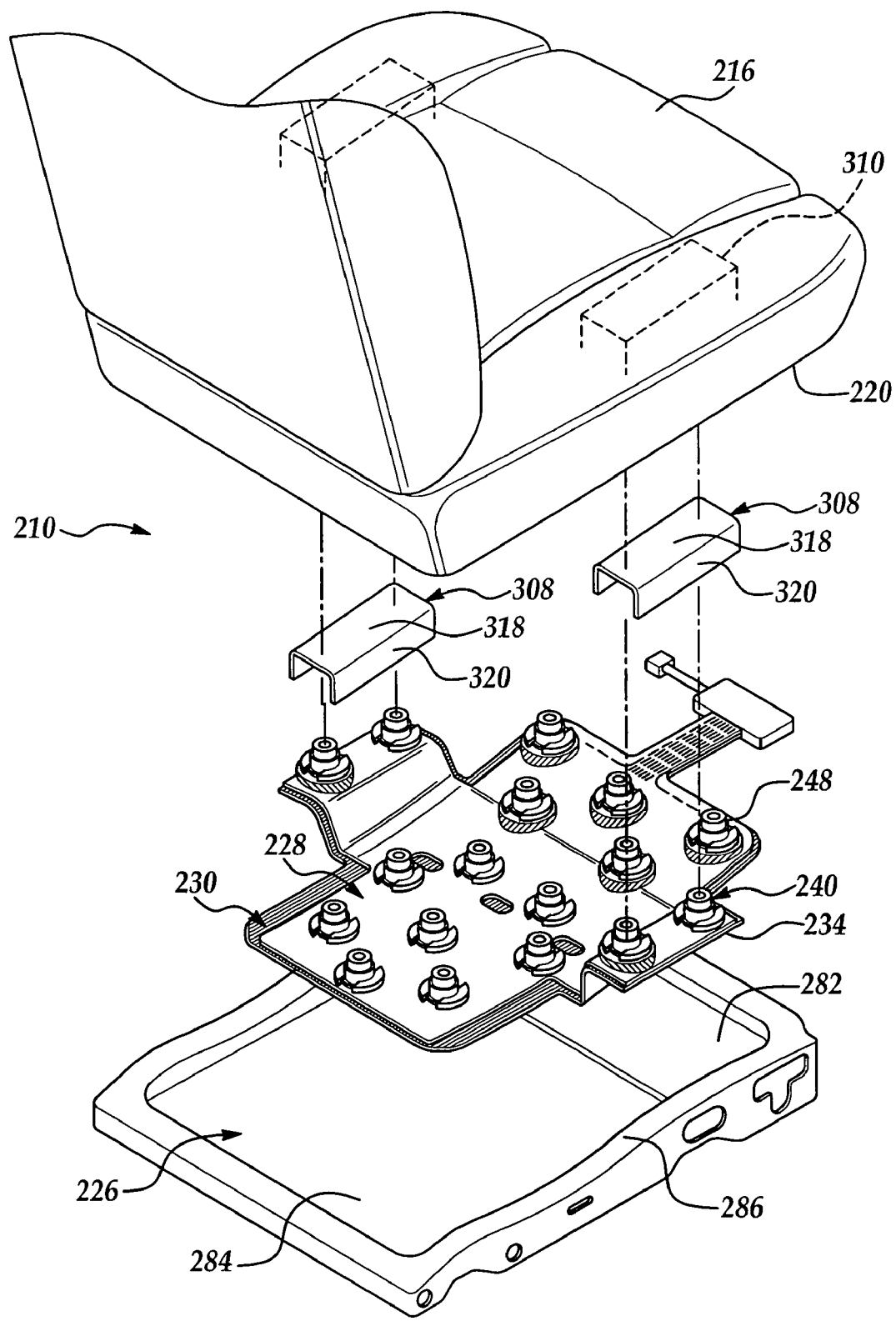
FIG. 3 is a perspective view of another embodiment of the reinforcement inserts of the present invention.

Turning now to FIG. 3, a second embodiment of a vehicle seat assembly is generally indicated at 210 where like numerals increased by 200 are used to designate like structure with respect to the embodiment illustrated in FIGS. 1 and 2. The seat cushion 216, seat pan 226 having a forward portion 282 and rear portion 285, tray 230, electrical circuit 234. and vehicle occupant sensing system 228 are substantially similar to those described in relation to FIG. 1. Accordingly, that description is not repeated here.

As shown, the vehicle seat assembly 210 includes a reinforcing insert 308 having a U-shaped cross section. The reinforcing insert 308 defines an engaging member 318 and two flanges 320. The two flanges 320 extend perpendicularly from opposing sides of the engaging member 318. The reinforcing insert 308 is positioned in the recesses 310 of the seat cushion 216 such that the flanges 320 point away from the seat cushion 216. As such, the flanges 320 are disposed on either side of the sensor assemblies 240 positioned above the bolsters 286 of seat pan 226, and the engaging member 318 is leveled above the corresponding upper slide members 248.

Both embodiments of the reinforcing insert 108, 308 protects the softer foam of the seat cushion 16, 216 from premature wear caused by repetitive pressure from the harder material of the sensor assemblies 40, 240 occurring when an occupant sits on the seat cushion 16, 216. As the occupant sits on the vehicle seat assembly 10, 210 the sensor assemblies 40, 240 press up toward the seat cushion 16, 216 but because of the reinforcing insert 108, 308 pressure from the sensor assemblies 40, 240 can be more evenly distributed on the seat cushion 16, 216 such that the seat cushion 16, 216 is less likely to wear over time. Advantageously, the sensor assemblies 40, 240 are less likely to detrimentally affect the comfort level of the vehicle seat assembly 10, 210.

The embodiments shown have reinforcing inserts 108, 308 positioned at the inboard side 22, 222 and outboard side 24, 224 of the seat cushion 16, 216. Because of the bolsters 86, 286 of the seat pan 26, 226 there is a reduced amount of foam thickness separating the occupant from the sensor assemblies 40, 240 adjacent the inboard side 22, 222 and outboard side 24, 224. However, the reinforcing inserts 108, 308 more evenly distribute the pressure from the sensor assemblies 40, 240 on the seat cushion 16, 216 in these areas such that wear to the seat cushion 16, 216 is less likely and comfort level of the vehicle seat assembly 10, 210 is unlikely to be detrimentally affected. It is noted, however, that the reinforcing inserts 108, 308 can be positioned anywhere between the seat cushion 16, 216 and the sensor assemblies 40, 240 without departing from the scope of the invention.

Figure 5:
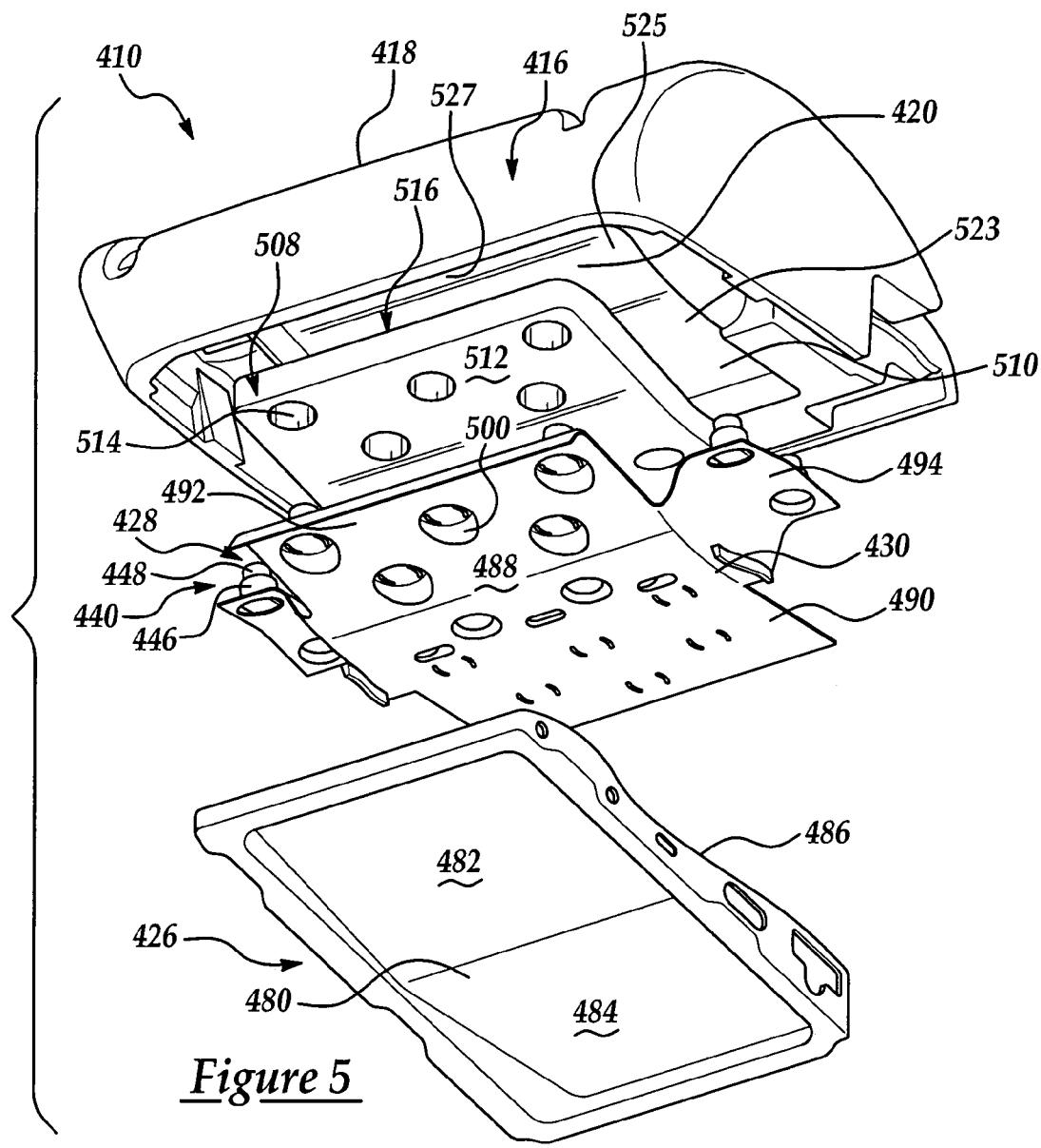
FIG. 5 is an exploded bottom perspective view of a vehicle seat assembly having a seat cushion insert positioned therein.

Another embodiment of the vehicle seat assembly of the present invention is generally indicated at 410 in FIG. 5, where like numerals increased by 400 are used to designate like structure with respect to the embodiment shown in FIGS. 1–4. The seat assembly 410 includes a seat cushion, generally indicated at 416. The seat cushion 416 defines an upper surface 418, or A-surface, and a lower surface 420, or B-surface, opposite to that of the upper surface 418. The seat cushion 416 has at least one recess 510 formed on the lower surface 420. In the embodiment shown in FIG. 5, the recess 510 is generally rectangular in shape and extends upward from surrounding areas of the lower surface 420 of the seat cushion 416. In the embodiment shown, the recess 510 is disposed on a middle portion of the lower surface 420 of the seat cushion 416. However, those having ordinary skill in the art will recognize that the recess 510 can be of any shape and can be disposed anywhere on and/or within the seat cushion 416 without departing from the scope of the present invention.

The vehicle seat assembly 410 also includes a seat pan, generally indicated at 426 and disposed underneath the seat cushion 416. Like the embodiments shown in FIGS. 1 and 3, the seat pan 426 includes a main body 480 and a plurality of bolsters 486 disposed on the periphery of the main body 480. The main body 480 defines a forward portion 482 and a rear portion 484, and the forward portion 482 is disposed at a positive angle relative to the rear portion 484. The seat pan 426 supports the seat cushion 416 and other components of the vehicle seat assembly 410 to be described in greater detail below.

Furthermore, the vehicle seat assembly 410 includes a vehicle occupant sensing system, generally indicated at 428. Like the embodiments shown in FIGS. 1 and 3, the vehicle occupant sensing system 428 includes a plurality of sensor assemblies, generally indicated at 440. Each sensor assembly 440 includes a base 446 and an upper slide member 448 supported for movement toward and away from the respective base 446 in response to a condition of the seat cushion 416. Similar to the embodiment of FIG. 1, the upper slide members 448 are biased away from the corresponding bases 446 toward the seat cushion 416, and weight from an occupant of the vehicle seat assembly 410 moves the upper slide members 448 into the corresponding bases 446. The vehicle occupant sensing system 428 correlates this movement of the upper slide members 448 to a condition of the vehicle seat assembly 410, such as whether the seat assembly 410 is occupied, whether the occupant is sitting in a certain position, or whether the occupant is within a certain weight range.

The vehicle seat assembly 410 additionally includes a carrier tray, generally indicated at 430, which supports the vehicle occupant sensing system 428. The tray 430 may of the type described in detail in applicant's co-pending patent application Ser. No. 10/749,169, entitled "Vehicle Occupant Sensing System Having Circuit Carrier Tray," which is incorporated herein in its entirety by reference. As such, the tray 430 includes a main body 488 and a plurality of bolsters 494 disposed on the periphery of the main body 488. The main body 488 defines a rear portion 490 and a forward portion 492, and the forward portion 492 is disposed at a positive angle relative to the rear portion 490. Also, like the embodiments shown in FIGS. 1 and 3, a plurality of pedestals 500 are attached to the forward portion 492 such that the axis of each pedestal 500 is generally perpendicular to the rear portion 490 of the tray 430. Each pedestal 500 supports a sensor assembly 440 thereon. The seat pan 426 supports the tray 430 such that the forward portion 492 and rear portion 490 of the tray 430 lie atop the forward portion 482 and rear portion 484 of the seat pan 426, respectively. Similarly, the seat pan 426 supports the tray 430 such that the bolsters 494 of the tray 430 lie atop the bolsters 486 of the pan 426.

Also, the vehicle seat assembly 410 includes at least one seat cushion insert, generally indicated at 508. The seat cushion insert 508 is generally thin and flat and defines an underside, generally indicated at 512, and a topside, generally indicated at 516. The seat cushion insert 508 is preferably made of a resilient material, such as polyurethane foam or any other suitable material. In the embodiment shown, the seat cushion insert 508 includes a forward portion 513 and a rear portion 515. The forward portion 513 is disposed at a positive angle relative to the rear portion 515 of the seat cushion insert 508.

Figure 6:
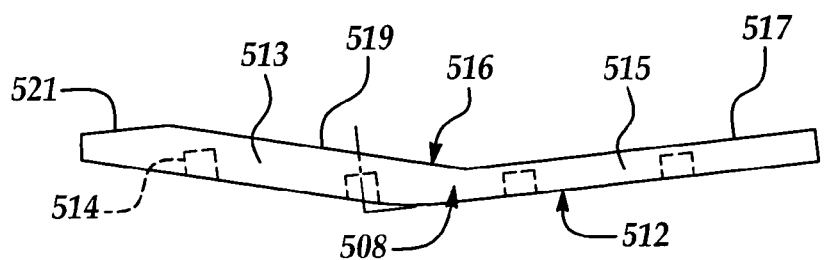
FIG. 6 is a side view of the seat cushion insert illustrated in FIG. 5.

The topside 516 of the seat cushion insert 508 has at least one planar section as best seen in FIG. 6. For instance, in the embodiment shown, the topside 516 of the seat cushion insert 508 includes a first planar section 517, a second planar section 519, and a third planar section 521. The first planar section 517 is disposed on the rear portion 515 and is generally horizontal. The second planar section 519 is disposed on the forward portion 513 and is disposed at a positive angle relative to the first planar section 517. The third planar section 521 is disposed in front of the second planar section 519 and is generally horizontal. As will be described in greater detail below, the planar sections 517, 519, 521 of the topside 516 improves the response of the vehicle occupant sensing system 428.

The seat cushion insert 508 is disposed between the seat cushion 416 and the sensor assemblies 428. More specifically, the seat cushion insert 508 is disposed over the main body 488 of the tray 430 and the main body 480 of the seat pan 426. Also, the forward portion 513 and rear portion 515 of the seat cushion insert 508 are positioned over and generally parallel to the forward portion 492 and rear portion 490 of the tray 430. Thus, the upper slide members 448 positioned on the main body 488 of the tray 430 contact the underside 512 of the seat cushion insert 508, and deflection of the seat cushion insert 508 toward the seat pan 426 moves those upper slide members 448 into the respective bases 446. However, the vehicle seat assembly 410 can be designed such that the seat cushion insert 508 is positioned over any sensor assembly 440 in the vehicle occupant sensing system 428 without departing from the scope of the invention.

The seat cushion insert 508 also includes at least one indent 514 adapted to receive at least one of the upper slide members 448 of the vehicle occupant sensing system 428. In the embodiment shown, the seat cushion insert 508 includes a plurality of indents 514, each circular in shape and extending upward from the underside 512 of the seat cushion insert 508. The indents 514 are spaced intermittently about the seat cushion insert 508 such that the indents 514 are spaced directly above corresponding ones of the sensor assemblies 440 and the upper slide members 448 are positioned within corresponding indents 514.

The forward portion 513 of the seat cushion insert 508 includes indents 514 as well, and the indents 514 on the forward portion 513 each define an axis that is generally perpendicular to the rear portion 515 of the seat cushion insert 508. The indents 514 on the forward portion 513 are oriented in this way in order to align with the sensor assemblies 440 on the forward portion 492 of the tray 430.

Also, the topside 516 of the seat cushion insert 508 is in contact with the lower surface 420 of the seat cushion 416. Accordingly, the lower surface 420 of the seat cushion 416 has at least one planar portion such that the lower surface 420 corresponds in shape to the topside 516 of the seat cushion insert 508. For instance, in the embodiment shown, the recess 510 of the seat cushion 416 includes a first planar portion 523, a second planar portion 525, and a third planar portion 527. The first planar portion 523 is generally horizontal, the second planar portion 525 is forward of the first planar portion 523 and disposed at a positive angle relative to the first planar portion 523, and the third planar portion 527 is forward of the second planar portion 525 and is generally horizontal. The seat cushion insert 508 is disposed within the recess 510 so that the first planar section 517 of the seat cushion insert 508 is flush against the first planar portion 523 of the seat cushion 416, the second planar section 519 of the seat cushion insert 508 is flush against the second planar portion 525 of the seat cushion 416, and the third planar section 521 of the seat cushion insert 508 is flush against the third planar portion 527 of the seat cushion 416.

The seat cushion insert 508 allows the load bearing characteristics of the vehicle seat assembly 410 to be altered more easily. For instance, a vehicle seat assembly 410 with predetermined load bearing characteristics may be desired. To obtain such a vehicle seat assembly, a seat cushion insert 408 with predetermined material characteristics, such as a predetermined density and/or indentation load deflection (ILD), is positioned between said seat cushion 416 and said sensor assemblies 440 within the recess 510 of the seat cushion 416. Those predetermined material characteristics provide the vehicle seat assembly 410 with the predetermined load bearing characteristics such that weight from the occupant is distributed through the seat cushion 416 to the sensor assemblies 440 as desired. In order to change the load bearing characteristics of the vehicle seat assembly 410, the seat cushion insert 508 is simply replaced with another insert 508 having other desired material characteristics. Therefore, the load bearing characteristics of the vehicle seat assembly 410 can be changed without having to replace the entire seat cushion 416, thereby saving assembly time and money.

The seat cushion 416 and seat cushion insert 508 are typically molded. Gas bubbles within the mold cavity typically travel and settle near the outer surfaces and cause voids or other imperfections to form. The imperfections can detrimentally affect the response of the vehicle occupant sensing system 428. If the outer surfaces are curved, the gas bubbles typically congregate on these curved surfaces, and the resultant congregation of voids exacerbates the detrimental effect on the response of the vehicle occupant sensing system 428. However, the seat cushion insert 508 of the present invention includes the planar sections 517, 519, 521. Because these sections 517, 519, 521 are planar, the gas bubbles are less likely to congregate and form on the topside 516 of the seat cushion insert 508. Also, because the portions 523, 525, 527 of the seat cushion 416 are planar, the seat cushion insert 508 mates against a similarly flat surface with a lower concentration of voids. Accordingly, the response of the vehicle occupant sensing system 428 improves.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A vehicle seat assembly comprising:
   a seat cushion including an upper surface and a lower surface, said lower surface having at least one planar portion, said seat cushion including a recess formed on said lower surface thereof;
   a vehicle occupant sensing system having a plurality of sensor assemblies, each including a base and an upper slide member, said upper slide member supported for movement toward and away from said base in response to a condition of said seat cushion; and
   a seat cushion insert having a topside and an underside where said topside has at least one planar section, said seat cushion insert disposed within said recess of said seat cushion between said seat cushion and said sensor assemblies with said topside of said seat cushion insert in contact with said lower surface of said seat cushion such that said lower surface of said seat cushion corresponds in shape to said topside of said seat cushion insert.

2. A vehicle seat assembly as set forth in claim 1, further comprising a seat pan with a middle section and a plurality of bolsters disposed on a periphery of said middle section, said seat cushion insert disposed over said middle section of said seat pan.

3. A vehicle seat assembly as set forth in claim 1, wherein said seat cushion insert is made out of polyurethane foam.

4. A vehicle seat assembly as set forth in claim 1, wherein said seat cushion insert includes a forward portion and a rear portion, said forward portion disposed at a positive angle relative to said rear portion of said seat cushion insert, said forward portion and said rear portion defining said topside of said seat cushion insert.

5. A vehicle seat assembly as set forth in claim 4, wherein said forward portion includes at least one indent defining an axis that is generally perpendicular to said rear portion of said seat cushion insert.

6. A vehicle seat assembly as set forth in claim 1, wherein said seat cushion insert includes at least one indent adapted to receive at least one of said upper slide members.

* * * * *